United States Patent
Morello

(10) Patent No.: US 11,896,014 B2
(45) Date of Patent: Feb. 13, 2024

(54) METHOD AND APPARATUS FOR SHAPING PIZZA DOUGH

(71) Applicant: MORELLO FORNI DI MORELLO MARCO & C. S.A.S., Ceranesi (IT)

(72) Inventor: Mario Morello, Ceranesi (IT)

(73) Assignee: MORELLO FORNI DI MORELLO MARCO & C. S.A.S., Ceranesi (IT)

( * ) Notice: Subject to any disclaimer, the term of this patent is extended or adjusted under 35 U.S.C. 154(b) by 737 days.

(21) Appl. No.: 16/652,864

(22) PCT Filed: Sep. 26, 2018

(86) PCT No.: PCT/IB2018/057429
§ 371 (c)(1),
(2) Date: Apr. 1, 2020

(87) PCT Pub. No.: WO2019/069177
PCT Pub. Date: Apr. 11, 2019

(65) Prior Publication Data
US 2020/0229450 A1    Jul. 23, 2020

(30) Foreign Application Priority Data

Oct. 5, 2017   (IT) .................. 102017000111949

(51) Int. Cl.
*A21C 11/00* (2006.01)
*A21C 3/02* (2006.01)

(52) U.S. Cl.
CPC ............ *A21C 11/008* (2013.01); *A21C 3/028* (2013.01); *A21C 11/004* (2013.01); *A21C 11/006* (2013.01)

(58) Field of Classification Search
CPC ........... A21C 3/02; A21C 3/024; A21C 3/028; A21C 11/00; A21C 11/004; A21C 11/006; A21C 11/008
(Continued)

(56) References Cited

U.S. PATENT DOCUMENTS 3,313,230 A * 4/1967 Simjian ................ A47J 37/0611
426/523
5,204,125 A    4/1993 Arsen
(Continued)

FOREIGN PATENT DOCUMENTS

EP    0015194 A1    9/1980
EP    0463221 A1    1/1992
(Continued)

OTHER PUBLICATIONS

International Search Report, priority document.
Japanese Office Action for corresponding Japanese Patent Application No. 2020520055 dated Apr. 18, 2023.

*Primary Examiner* — Reginald Alexander
(74) *Attorney, Agent, or Firm* — Greer, Burns & Crain, Ltd.

(57) ABSTRACT

A method and an apparatus of forming food dough to be used for making bases for pizza and the like are described. The method provides for compressing a predefined mass or dose of dough between two surfaces and massaging it by deforming one of said surfaces, consisting of a flexible diaphragm whereon the dough is worked. For this purpose, the forming machine has idle tapered rollers arranged under the diaphragm, which make a motion of revolution about a vertical axis and roll on the extrados of the diaphragm. During the forming process, the dough is squeezed by a movable plate or cover.

14 Claims, 11 Drawing Sheets

(58) Field of Classification Search
USPC .............................. 425/394, 409, 411; 99/349
See application file for complete search history.

(56) References Cited

U.S. PATENT DOCUMENTS

| | | | |
|---|---|---|---|
| 5,697,491 A | 12/1997 | Alex | |
| 6,048,191 A * | 4/2000 | Beltrami | A21C 11/006 425/89 |
| 9,648,986 B1 * | 5/2017 | Byrne | A21C 11/008 |
| 2009/0162512 A1 * | 6/2009 | Morikawa | A21C 11/008 426/551 |
| 2011/0100232 A1 | 5/2011 | Aonuma | |
| 2014/0076301 A1 * | 3/2014 | Wang | A47J 37/0611 126/261 |

FOREIGN PATENT DOCUMENTS

| | | | | |
|---|---|---|---|---|
| EP | 2701519 B1 | 7/2015 | | |
| FR | 2569334 A1 | 2/1986 | | |
| FR | 2768305 A1 | 3/1999 | | |
| IT | GE20130020 A1 | 8/2014 | | |
| JP | H1147340 A | 6/1989 | | |
| JP | H01252266 A | 10/1989 | | |
| JP | H4293447 A | 10/1992 | | |
| JP | H7187341 A | 7/1995 | | |
| JP | H1252266 A | 10/1999 | | |
| JP | 2006034285 A | 2/2006 | | |
| JP | 2008054641 A | 3/2008 | | |
| JP | 2009118812 A | 6/2009 | | |
| WO | WO-2015115220 A1 * | 8/2015 | ........... | A21C 11/006 |

* cited by examiner

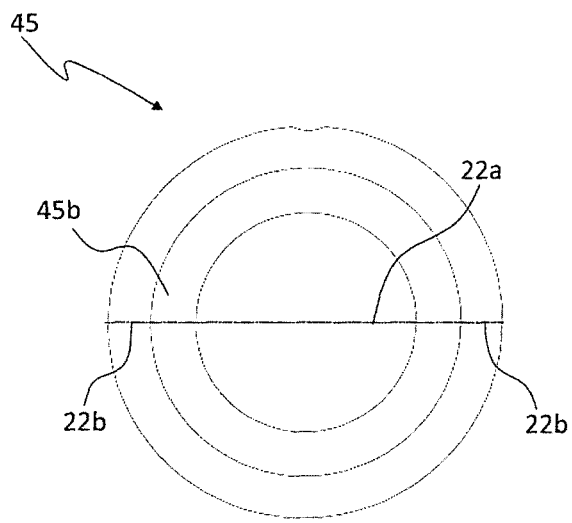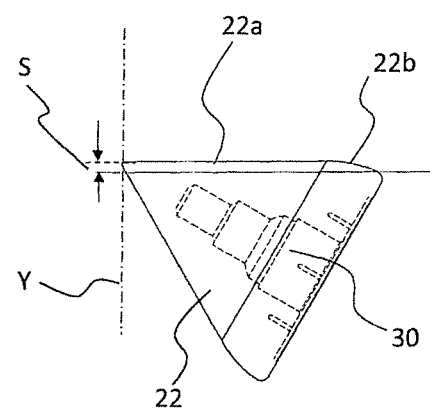
Fig. 11
Fig. 12

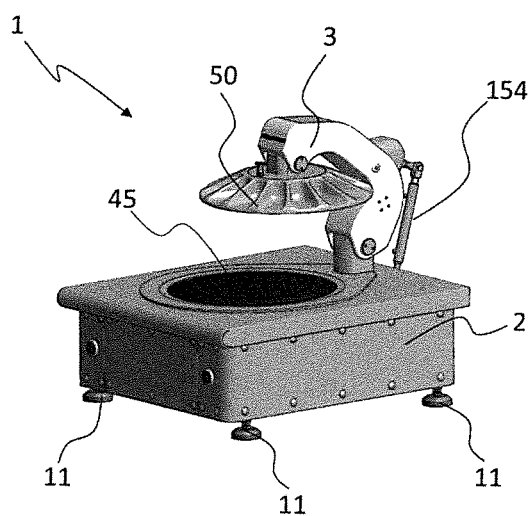
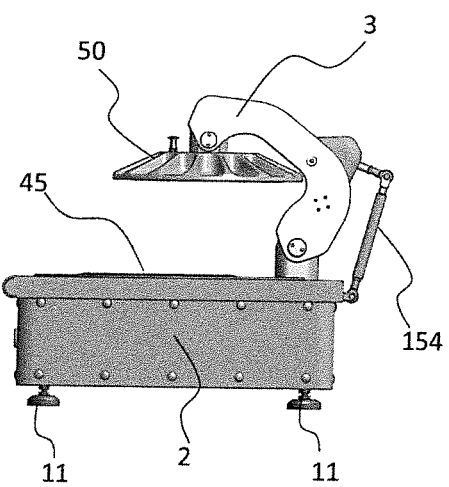
Fig. 13
Fig. 14

METHOD AND APPARATUS FOR SHAPING PIZZA DOUGH

In a general aspect thereof, the present invention relates to the working of food doughs for forming bases to be subsequently used for preparing dishes.

Before proceeding any further, it is worth pointing out right away that, for clarity and simplicity in describing the invention and its features, in the present description and in the appended claims reference will mostly be made to pizza and to the preparation thereof by working a pizza dough.

However, this should not be interpreted as a limitation, in that the invention is also applicable to food doughs for preparing other dishes, such as piadina, Arab bread, Greek pita, South American tacos and other similar dishes of the various gastronomic and culinary traditions worldwide.

With this in mind, therefore, it can be stated that, when preparing pizza manually, i.e. hand-made pizza in pizza shops and restaurants, or industrially through the use of suitable machinery, the process starts from a dough consisting of a predefined mass containing flour, water and leaven, which dough is then rolled out to obtain a layer a few millimetres thick having the characteristic circular shape, commonly called pizza base.

Other ingredients are then laid on this base, which for pizza include cheese, tomato sauce, olives, anchovies, and all the other ingredients needed for preparing the dish, according to the numerous possible recipes (Margherita, Neapolitan, etc.).

Note that these operational steps equally apply, mutatis mutandis, to manual or handicraft pizza making and also for industrial or automated production.

Pizza dough can be worked manually with or without tools such as, for example, a rolling pin or another tool suitable for spreading the dough and reduce its thickness.

Using the hands only requires some ability and manual skill, which are typical of experienced professionals, such as the so-called pizza makers; even though these people are usually very capable and skilful, it can nevertheless be understood that working pizza dough wholly by hand is inevitably a time-consuming process.

It should also be taken into account that, when the dough is worked completely by hand, the result will depend on the human operator, whose performance, since he/she is not a machine, may differ from time to time or from another pizza maker's performance.

In fact, as can be intuitively understood, the pizza maker's psychophysical conditions change according to the circumstances, such as tiredness or concentration (e.g. he/she will be fresher at the beginning of a work shift than at the end), and this affects the uniformity of the performance and the quality of the final product.

On the other hand, when a tool like a rolling pin is used for spreading the dough, the work is carried out more quickly, but this will result in higher chemical-physical stress for the dough, with the risk of altering its organoleptic characteristics and therefore the quality of the product thus obtained.

Aiming at overcoming such situations, machines have been designed for working dough and obtaining pizza bases in an automated (or semi-automated) manner.

These are essentially presses that squeeze the dough between two flat surfaces, so as to cause it to become thinner while at the same time expanding radially, in accordance with the desired disk-like configuration.

Another machine type consists of rolling machines comprising two motorized rollers arranged opposite to each other, at such a distance as to allow the dough to pass between them.

In this case, a strip of dough having the desired thickness is obtained, so that, if a round pizza base is needed, the dough will have to be subjected to further forming; from an industrial viewpoint, this solution implies an additional processing step, which inevitably results in increased production costs and times.

Moreover, the rolling of the dough by the rollers generates mechanical stresses in the mass of dough, which may deteriorate it or anyway alter it, thus adversely affecting the final product.

An evolution of this state of the art is represented by the machines manufactured by company Rheon Automatic Machinery, described in the Japanese patent applications published under the numbers JP 2007 006866; JP 2007 174953; JP 2007 020520; JP 2008 054641.

In short, these machines comprise dough rolling rollers having a tapered, as opposed to cylindrical, shape, arranged with converging axes, and having a horizontal generatrix; this will result in a different peripheral speed of the rollers along their horizontal generatrix, where contact occurs with the dough to be rolled out radially.

The number of tapered rollers may vary (typically two, three or four), and they are supported by an upper structure of the machine, which may be fixed or rotatable about a vertical axis (much like a planetary gear train carrier of a differential gear).

The tapered rollers act upon the dough, which is supported by a worktable, which is preferably rotatable about the same vertical axis as the roller carrier. According to the different embodiments described in the Japanese publications, the distance between the rolling rollers and the dough support plane is changed by raising or lowering the former relative to the latter, or vice versa, so that it can be adapted to the thickness of the dough, which changes during the processing.

The dough support plane may consist of a fixed or rotatable table or platform, or a conveyor belt.

Furthermore, some of the above-mentioned Japanese patent applications describe machine adjustment systems that control the drive torque applied to the tapered rollers and/or to the dough support table as a function of several parameters, such as absorbed current, revolution speed, processing phase, and the like.

Although these technical solutions are rather sophisticated, the machines known from these Japanese prior documents are still of the type wherein rollers act upon the dough to be rolled out, thus stressing it mechanically in a non-uniform manner, and resulting in the same contraindications already described with reference to this type of machines.

Therefore, the machines known from the above-mentioned Japanese documents are not only complex and expensive to manufacture, but also unsatisfactory as concerns the working of the dough, since the latter is subjected to a rolling action by the rollers in contact therewith.

In this respect, a more effective solution seems to be the one described in European patent application published under number EP 2701519, wherein there is a food-grade cloth or fabric interposed between a set of rolling rollers and the dough.

Therefore, the latter does not come in contact with the cylindrical rollers, which are idle, i.e. non-motorized, and are arranged with their axes oblique relative to the vertical axis of the machine, around which the circular shape of the pizza base is obtained.

In this case the rollers are supported over the dough by a complex system of coaxial shafts sliding longitudinally relative to each other and rotating about the vertical axis of the machine.

This solution appears to be very complex from a mechanical viewpoint, so that, in addition to being affected by the same contraindications as the Japanese prior-art documents, it does not seem to be able to provide an effective and/or uniform action for forming a pizza base.

In fact, the arrangement of the rollers with oblique axes causes sliding against the separation cloth, resulting in the risk of the latter folding or breaking due to tear or wear; furthermore, in the machine of EP 2701519 there are two sets of rollers, an outer one and an inner one, which are activated in succession for forming the edge of the pizza.

In light of this close examination, it is a technical problem at the basis of the invention to provide a method of forming a dough for preparing pizza and other similar food, which has such operational characteristics as to overcome the limitations of the above-described state of the art.

Another technical problem is to provide a method of forming dough which allows keeping its organoleptic characteristic substantially unchanged.

A further technical problem is to provide a method of forming dough which can be implemented mechanically in a simple and effective manner, i.e. through machines and/or apparatuses that are not so complex as those considered above.

One solution to such problems is to form the dough by acting upon it indirectly, i.e. through interposition of a flexible element between the dough and the means that exert the pressure necessary for rolling it out, along radial directrices relative to the shape to be obtained.

Another solution is to work the dough in alternate cycles, i.e. by periodically reversing the direction of the pressure action exerted on the dough.

In this way, in fact, any direct contact between mechanical parts in motion and the dough is avoided, while at the same time distributing more evenly in space and time the action exerted thereon.

The features of the forming method according to the invention are specifically set out in the claims appended to the present description.

The invention further comprises a machine or apparatus for implementing the forming method, the features of which are also set out in the appended claims.

The invention as a whole, as well as the features thereof and the effects deriving therefrom, along with the advantages it provides, will become more apparent from the following description of an embodiment thereof, supplied by way of non-limiting example, with reference to the annexed drawings, wherein.

Figure 1:
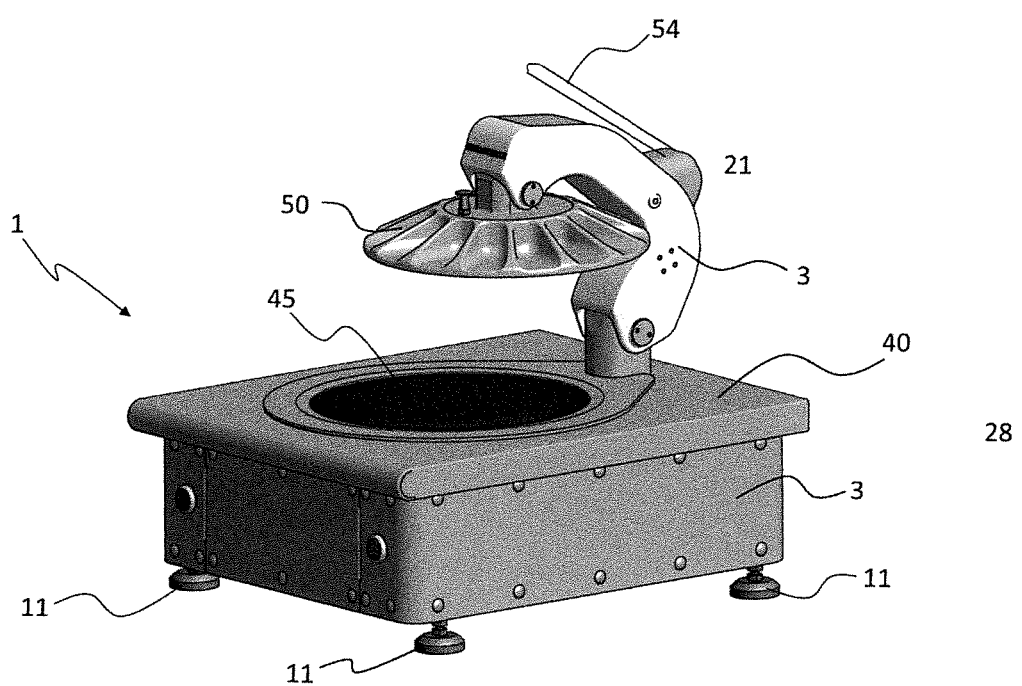
FIG. 1 shows a perspective view of a dough forming machine according to the invention.
Figure 2:
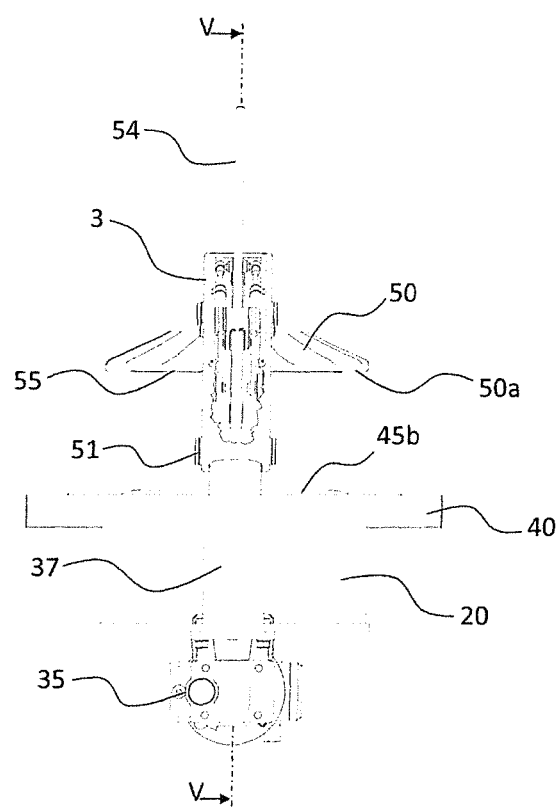
FIG. 2 shows some internal details of the machine of FIG. 1.
Figure 3:
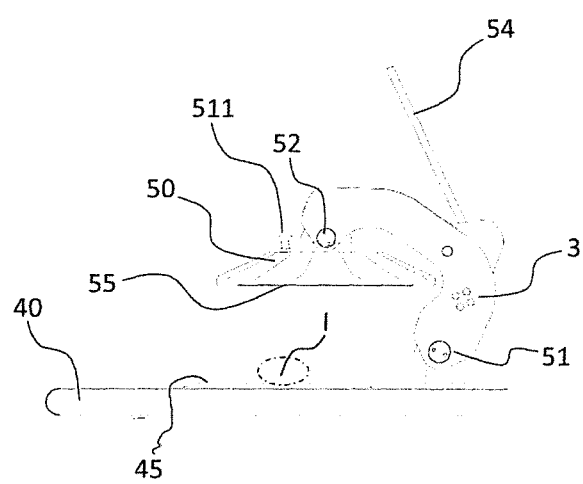
FIGS. 3 and 4 show a side view of respective operating steps of a component of the machine of the preceding figures.
Figure 4:
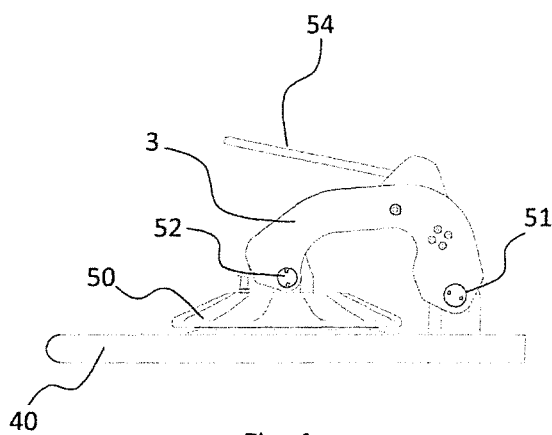
Figure 5:
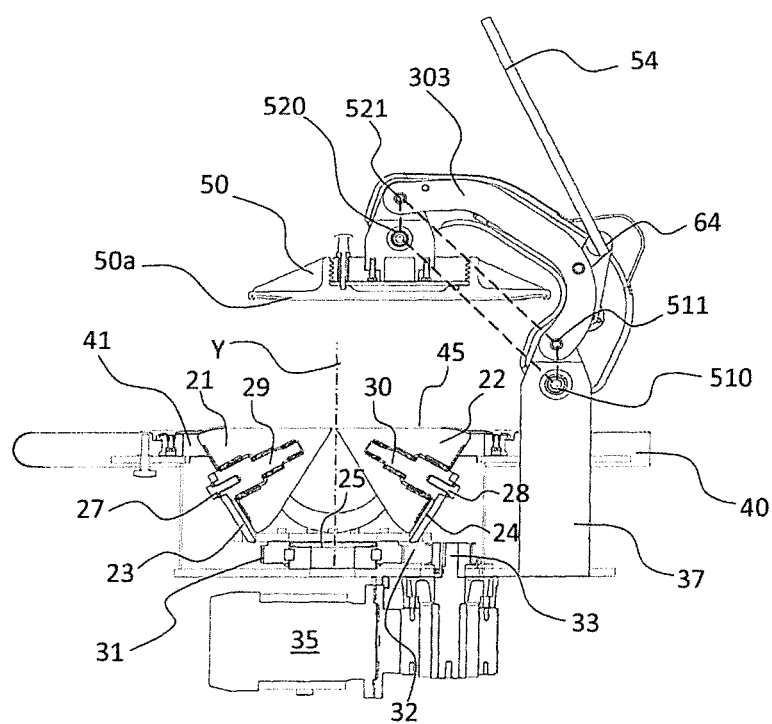
Figure 6:
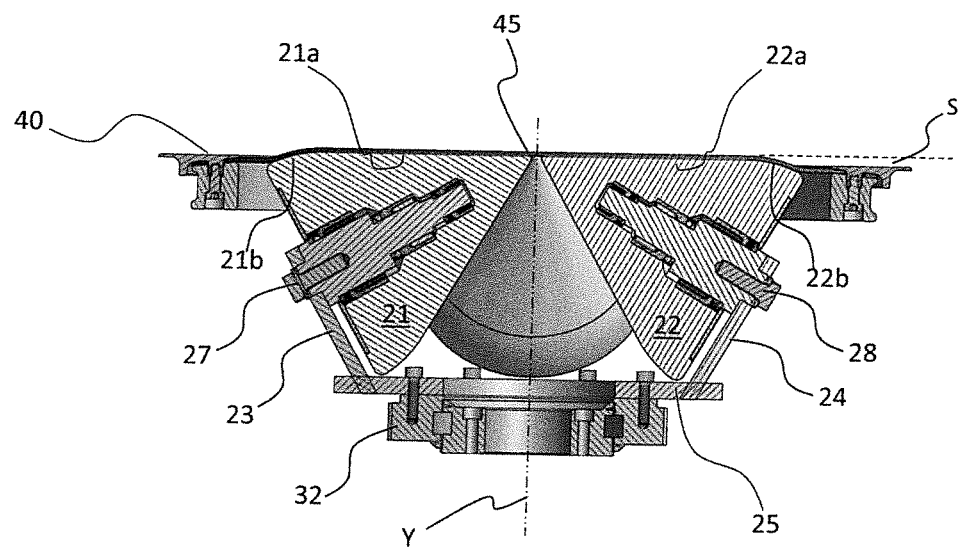
Figure 7:
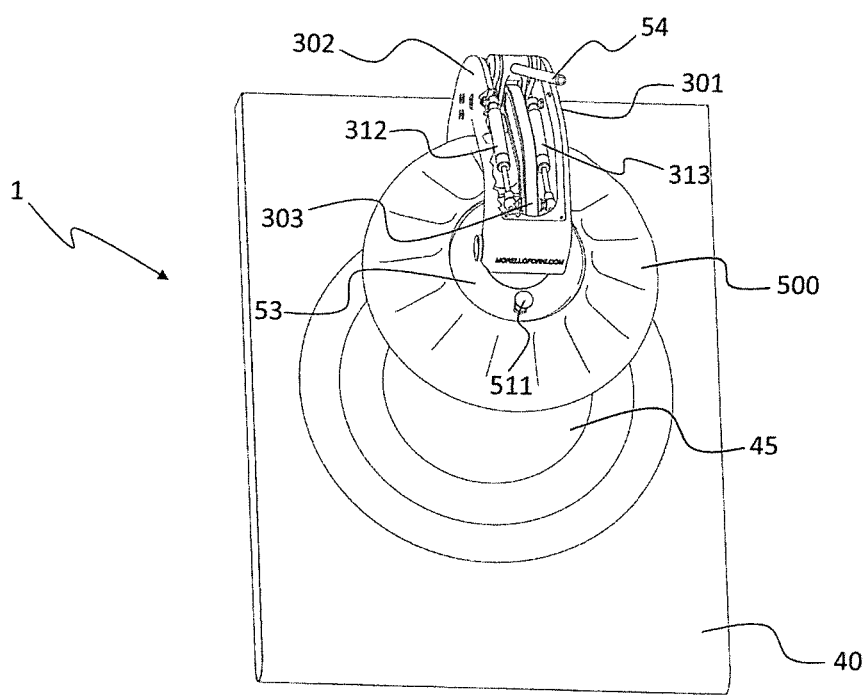
Figure 8:
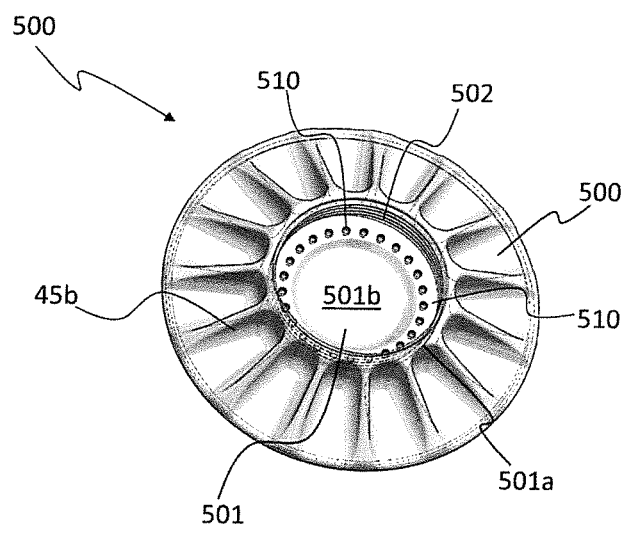
Figure 9:
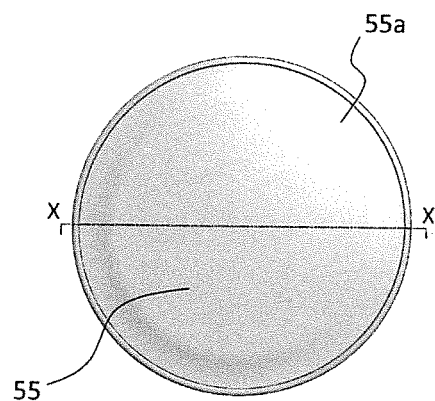
Figure 10:
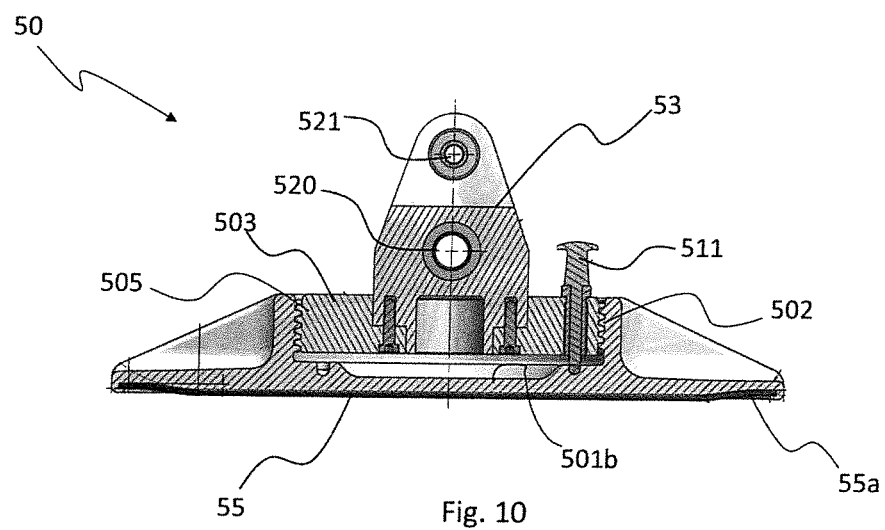

FIGS. 3(*a*) and 4(*a*) show views, corresponding to those of FIGS. 3 and 4, of the same component of the machine, with its internal parts in sight;

FIG. 5 is a sectional view along line V-V of FIG. 2;

FIG. 6 is a magnified view of a part of FIG. 5;

FIG. 7 is a top view of the machine of the preceding figures, with a part thereof removed in order to make some internal components of the articulated arm visible;

FIGS. 8 and 9 are respective top and bottom views of a plate of the preceding machine;

FIG. 10 is a sectional view along line X-X of FIG. 9;

FIG. 11 shows a top view of the diaphragm of the machine of the preceding figures;

FIG. 12 schematically shows the arrangement of a tapered roller of the machine;

FIGS. 13 and 14 show a perspective and lateral view of a variant of the machine of the preceding figures.

With reference to the drawings and the above-listed figures, numeral 1 designates as a whole a machine for forming dough for pizza bases and similar food, in accordance with the invention.

The machine 1 of this example operates semi-manually, as will be further explained hereinafter, and is small in size (approx. 50 cm long, 75 cm deep and 80 cm high), so that it can be arranged on a kitchen top or in the oven area of a pizza shop.

The forming machine 1 comprises a base 2 surmounted by an articulated arm 3, which will be described separately below.

Starting from the base 2, it has a substantially parallelepiped or box-shaped external structure 10 fitted with support feet 11; the external structure 10 is made from sheet-metal or any other appropriate material (e.g. plastic or the like) and is used as, among other things, a housing for a manipulator mechanism 20 for manipulating the dough to be formed, which is more clearly visible in FIGS. 2, 5 and which will be briefly described below.

The manipulator mechanism 20, also briefly referred to as manipulator, comprises a pair of idle tapered rollers 21, 22 with concurrent axes inclined relative to the worktable of the machine 1, so as to have respective horizontal generatrices aligned along a diameter, as will be further explained hereinafter.

In this regard, it must be pointed out that, although in this example the rollers are two (i.e. one pair), they may also be more numerous, e.g. three, four, or more; this will depend on the dimensions of the rollers and/or of the forming machine, the revolution speed of the rollers about their own axis and about a vertical axis Y of the machine, the diameter of the pizza bases to be worked, etc.

The rollers 21, 22 are idle and supported by respective arms 23, 24 that extend in diverging directions from a centre plate or platform 25 rotatable about said vertical axis Y; in the example of embodiment shown in the drawings, they are mounted on the arms 23, 24 by means of screws or other suitable means 27, 28, which fasten the bearing-carrying pins 29, 30 coupled to the rollers 21, 22.

The latter may be made of any appropriate material, e.g. metal or plastic, though according to a teaching of the invention they must be able to co-operate by friction with a diaphragm 45 whereon a dough is worked; they must also have good mechanical characteristics, so as to not become excessively deformed during the operation of the machine, and must be sufficiently light to not require excessive power to be rotated about the vertical revolution axis Y of the machine.

For this reason, one material that has been verified to be suitable for manufacturing the tapered rollers 21, 22 is nylon.

The centre plate 25 is associated with a toothed wheel 31 rotated by a transmission including a toothed belt 32 and a pinion 33; this transmission, and therefore the centre plate 25 with the tapered rollers 21, 22, is driven by an electric motor 35, which in this example is located underneath a plate 36 arranged transversally to the machine base 2, within the box-shaped structure 10.

Of course, the position and/or configuration of the electric motor 35 and of the other components of the mechanical transmission for moving the centre plate 25 may be different from those of the example shown in the drawings, according to the dimensions of the machine and to the possible machine design choices.

Therefore, the electric motor 35 may be arranged alongside the centre plate 25 or in front of it, and the transmission belt 32 may be replaced with joints or gear trains.

However, regardless of the position and/or configuration of the electric motor 35, with an optional motoreducer and the other components of the mechanical transmission 32, 33, what is important is that the means for driving the centre plate 25 are adapted to reverse the rotary motion of the assembly including the tapered rollers 21, 22 about the vertical axis Y in both directions (clockwise and counterclockwise).

Therefore, in the example shown in the drawings the electric motor 35 is of a type capable of reversing the drive imparted to the toothed belt 32 and the pinion 33, in order to obtain clockwise and counterclockwise rotation of the tapered rollers 21, 22 integrally with the centre plate 25 whereon they are mounted.

The reversal of the rotary motion is controlled by the control system with which the machine is equipped, not shown in the drawings for simplicity's sake; the reversal of the clockwise-counterclockwise motion (and vice versa) occurs cyclically at time intervals which may be predefined and/or selected by a user of the machine 1, e.g. by reversing the polarity of the electric motor's power supply by means of an inverter or another suitable device.

For this purpose, the machine 1 is preferably fitted with a timer or other equivalent means, which can establish the duration of the phases of the alternating revolution cycles of the assembly including the tapered rollers 21 and 22.

The Applicant has been able to verify experimentally that, when the assembly of tapered rollers 21, 22 is made to rotate about the axis Y at a revolution speed of approximately 150 rpm, and the revolution direction is reversed approximately every 2.5-3 seconds, a disk of dough weighing 200-250 grams is obtained within 10-20 seconds.

In general, it can be stated that the cycles of reversal of the revolution direction of the assembly including the tapered rollers 21, 22 have a period that may range between a few seconds (e.g. 2 to 5 seconds) and a few tens of seconds (10 to 60 seconds); this may depend on several factors, including: the number of tapered rollers 21, 22 (which, as aforesaid, may also be more than two, e.g. 3, 4 or more); the dimensions of the machine (and hence of the rollers 21, 22, the diaphragm 45, etc.); the mass of dough to be worked (e.g. 200-250-300 grams) and/or the diameter of the pizza base to be obtained; the type of dough (e.g. for pizza or for piadina, Arab bread, pide or lahmajoun, etc.).

In this example of embodiment of the invention, the cross-plate 36 in the base 2 of the machine 1 also serves as a support for a column 37 supporting the articulated arm 3 that bears a plate 50, which will be described later on.

The base 2 of the machine further comprises an upper worktable 40, whereon a dough I to be worked is laid.

More in particular, the worktable 40 has a circular central opening 41 closed by a diaphragm 45, where the horizontal generatrices 21a, 22a of the tapered rollers 21, 22 come to light; the diaphragm 45 is secured to the worktable 40 under a predefined tension, so that it can adapt itself to the underlying tapered rollers 21, 22 while at the same time maintaining a flat surface for working a dough.

In accordance with a preferred embodiment, the tapered rollers 21, 22 have a rounded edge or corner 21b, 22b at their base, so that the diaphragm 45 adhering thereon has an inclined profile in the peripheral region where it connects to the worktable 40, as shown in FIGS. 7-9.

This allows obtaining the swollen edge ("cornicione") of pizza bases without solution of continuity during the dough rolling process, as will be further explained below.

The diaphragm 45 is flexible and has elasticity characteristics that are suitable for this purpose; to this end, in accordance with a preferred embodiment, the diaphragm 45 is a two-component one, i.e. it comprises a bottom layer forming its intrados 45a (i.e. the one facing towards the tapered rollers 21, 22), made of silicone or another polymer having good elastic properties and a high coefficient of friction, and a top layer forming the extrados 45b, made of food-grade, non-stick material, such as polytetrafluoroethylene (PTFE, also known as Teflon®).

The diaphragm 45 thus made has a thickness of a few millimetres, preferably 1 to 15 mm, more preferably 1.5 to 3.5 mm, so as to have sufficient elasticity and flexibility to adapt itself to the shape of the rollers 21, 22 interacting with it, as can be seen in FIGS. 5 and 7.

Advantageously, in the forming machine 1 the top surface of the tapered rollers 21, 22 is in contact with the silicone intrados 45a of the diaphragm 45, which is held fixed and stretched relative to the worktable 40, so that the friction generated by the silicone-based material will cause the tapered rollers 21, 22 to rotate.

In this condition, the extrados 45b of the diaphragm 45 is slightly higher (0.5 to 10 mm) than the worktable 40, thus promoting the making of pizza bases with the so-called "cornicione", i.e. the swollen outer edge.

As aforementioned, the upper part of the machine 2 comprises an articulated arm 3, which is hinged, at a bottom end thereof, to the column 37 that supports it, and which supports, at the opposite top end, a plate or cover 50.

For this purpose, at the bottom and top ends of the arm 3 there are corresponding links or articulated joints 51, 52 for connecting the arm 3 to the column 37 and to the plate or cover 50, respectively.

Both the articulated arm 3 and the plate 50 supported by it have novel characteristics compared to the state of the art described above.

Figure 3A:
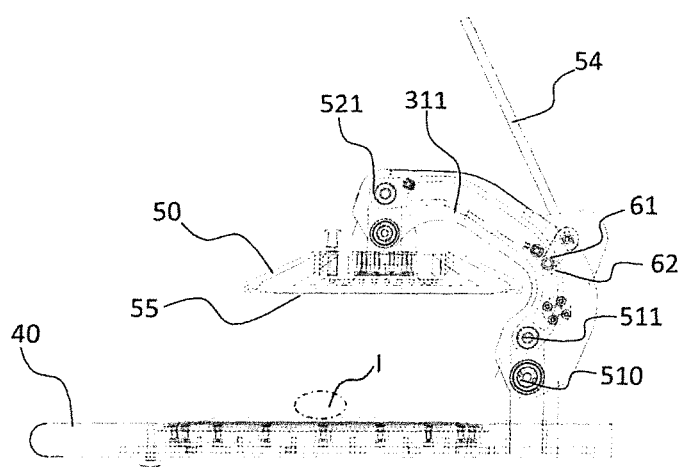
Figure 4A:
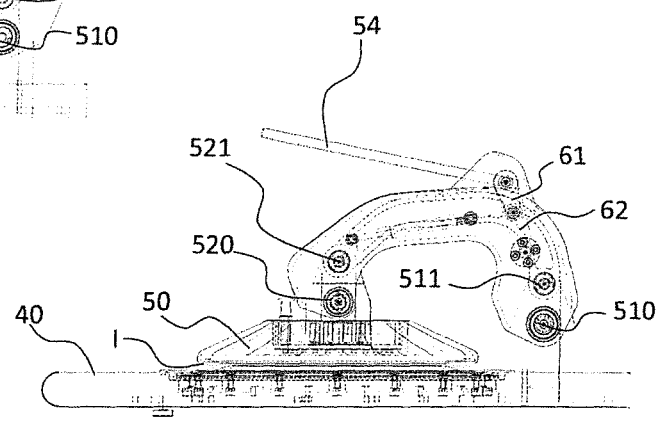

Starting from the former, the internal parts of which are more clearly visible in FIGS. 3(a), 4(a), 6, it has a structure that comprises two lateral half-arms 301, 302, arranged opposite and parallel to each other in the longitudinal direction, the ends of which are coupled to corresponding hinging pins 510 and 520, respectively belonging to the links 51, 52.

The structure of the articulated arm 3 further comprises a core or central element 303, interposed between the lateral half-arms 301 and 302, the ends of which are respectively coupled to two other hinging pins 511 and 521, also belonging to the links 51 and 52 of the arm 3.

In particular, the pins 510 and 511 of the first link 51 are supported at the top end of the column 37 that extends from the base 2 of the machine, whereas the third and fourth pins 520 and 521 are associated with a fitting 53 of the plate 50.

Advantageously, the four pins 510, 511 and 520, 521 are arranged at the vertices of an articulated quadrilateral (drawn with a dashed line in FIG. 5), the frame or fixed element of which consists of the end of the column 37 with the two pins 510 and 511, while the two rocker arms of the quadrilateral are the half-arms 301, 302 and the core 303, and wherein the mobile element or connecting rod is represented by the fitting 53 of the plate 50.

The articulated quadrilateral thus made allows the plate 50 to be kept oriented with its bottom face 50a substantially parallel to the worktable 40 during its translations caused by the rotations of the articulated arm 3 between the operating position, in which a dough I is worked in the machine 1, and an idle condition, in which the arm 3 is moved away from the worktable 40, and vice versa (see FIGS. 3, 3a and 4, 4a).

Advantageously, the trajectory of motion of the plate 50, determined by the support arm 3 and by the articulated quadrilateral as it moves away from the worktable 40, is such that when the plate 50 is raised, it will move backwards to clear the underlying part and allow manual actions by the operator.

This occurs both when loading a mass of dough I to be rolled out and when removing the worked dough, i.e. the formed pizza base.

In accordance with a preferred embodiment, the articulated arm 3 comprises an internal mechanism or linkage 60 for locking the arm in the lowered operating condition, so as to flatten the dough I during the forming process.

For simplicity, this operating condition will hereafter also be referred to as "bottom dead centre" (or BDC), since (just like piston-equipped machines) this is the condition in which the plate 50 lies down against the worktable 40; likewise, similarly to piston-equipped machines, the idle condition of the machine 1 wherein the plate 50 is raised upon a backward rotation of the arm 3 will be referred to as "top dead centre" (or TDC).

The locking mechanism 60 essentially comprises a crank 61 and a connecting rod 62, connected to the core 303 of the arm 3 and mutually articulated at a crank pin 64; as can be seen in the drawings, in this example of embodiment the crank pin 64 advantageously coincides with the point where a rod or handle 54 is connected to the half-arms 301, 302.

This provides a two-fold positive effect: manual control of the movements of the articulated arm 3 through a single lever, which de facto acts simultaneously upon the two rocker arms (the half-arms 301, 302 and the core 303 of the arm 3) of the articulated quadrilateral, and locking the articulated arm 3 when the plate 50 reaches the bottom dead centre, by acting upon the linkage 60.

In fact, as can be seen in the drawings, in the BDC condition, i.e. when the plate or cover 50 is down, the crank 61 and the connecting rod 62 are aligned along the same directrix, thus locking the articulated arm 3 while a dough laid on the diaphragm 45 is worked.

In order to unlock the mechanism 60 starting from this condition, it is sufficient to act upon the rod 54 by moving it in the direction opposite to the closing direction; such a movement will cause a rotation of the crank 61 and hence of the connecting rod 62, so that the half-arms 301, 302 and the core 303 can be released in order to move the articulated arm 3 into the idle condition.

In addition, the arm 3 comprises also some counterbalancing elements 311, 312, consisting in this example of air pistons, which operate between the half-arms 301, 302 and the core 303 of the arm 3, so as to compensate for the weight of the latter and for that of the plate 50 attached thereto, in order to facilitate the pizza-base forming operations. The configuration of the articulated arm 3, with the articulated quadrilateral comprising the fixed element consisting of the end of the column 37 with the two pins 510 and 511, and the two rocker arms of the quadrilateral consisting of the half-arms 301, 302 and the core 303, and wherein the mobile element or connecting rod is represented by the fitting 53 of the plate 50, allows obtaining, combined with the counterbalancing elements or air pistons 311, 312, an important effect of multiplication or amplification of the force that is applied in order to move the plate 50.

The latter can thus be moved by an operator without much effort, if the machine is in the manual version, or through a small, low-power actuator in the mechanized version of the machine.

By way of example, when using counterbalancing elements 311, 312 consisting of air pistons or springs having a rated thrust force of 25 kg (for a total of 50 kg), the plate 50 will stay in balance in the TDC raised condition, at a distance of about 170 mm from the worktable 40 and the diaphragm 45.

In this condition, the thrust of the pneumatic pistons 311, 312 compensates for the weight of the plate 50 and part of the articulated arm 3, which can be quantified to be approximately 10 kg; assuming a radius of rotation of approximately 45-50 cm of the end of the rod or handle 54 relative to the fulcrum coinciding with the vertex 510 of the articulated quadrilateral, it can be calculated that the force that needs to be exerted in order to lower the plate 50 towards the worktable amounts to a few kilograms, preferably in the range of 4-6 kg.

Once the plate 50 has been lowered into the dough compression position, the dough I is squeezed and flattened to a thickness of approximately 15 mm through the effect of the action exerted on the diaphragm 45 by the tapered rollers.

It must be observed that, in accordance with the preferred embodiment shown in the drawings, in such a condition the system comprising the articulated arm 3 with the plate 50 associated with its end and the handle 54 essentially form a lever of second order, i.e. an advantageous lever, with its fulcrum at the low vertex 510 of the articulated quadrilateral, wherein the force or action is applied downwards at the free end of the handle 54, while the reaction is generated by the dough I during the processing, which, when the plate 50 is in the lowered condition, is directed upwards perpendicularly to the worktable 40 and between the fulcrum 510 and the end of the handle 54.

This feature allows multiplying by a factor of 5-6 times the effect of the force exerted by a user at the end of the handle 54.

For example, considering the above-mentioned force of 4-6 kg in relation to the raised condition of the plate 50, the resulting compression force that squeezes the dough I may easily reach values in excess of 20 kg.

This allows for easy and accurate control of the force applied to the dough during the forming process.

As aforesaid, also the plate 50 has some original characteristics that allow the machine of the invention to attain high performance as concerns the quality of the processed products. In fact, as can be seen more clearly in FIGS. 10-12, the plate 50 comprises an outer peripheral flange or crown 500 having a central seat 501 into which the fitting 53 is mounted.

For this purpose, on the side wall 501a of the seat 501 there is a female thread 502 (preferably with a square or trapezoidal profile and a fine pitch), which engages with a corresponding male thread 505 of a joint or collar 503 associated with the fitting 53 of the plate 50; in this example, the collar 503 is secured to the fitting 53 by means of bolts 504, but they may however be made as one piece.

Furthermore, on the bottom 501b of the seat 501 there are a number of holes 510 evenly distributed (i.e. equidistant) along a circumference concentric to the side wall 501a of the seat 501.

Such holes are used for the fine adjustment of the position of the plate 50 with respect to the articulated arm 3, in that they are engaged by a locking pin 511 passing through the collar 503 of the fitting 53 of the plate 50.

In fact, in order to position the plate 50 at a predefined distance relative to the worktable 40 and the diaphragm 45, depending on the thickness of the pizza base to be made, the pin 511 is removed from the collar 503 to allow screwing or unscrewing the crown 500 relative to the threads 502 and 505, depending on the required adjustment.

Once the distance has been adjusted, the pin 511 is inserted through the collar 503 and engages into the hole 510 corresponding to the position taken after the unscrewing or screwing rotation of the plate 50, thus locking it (cfr. FIG. 8).

The bottom face 50a of the plate 50 is preferably coated with a food-grade membrane or film 55 similar to that of the extrados 45b of the diaphragm 45 of the base 2; the face 55 may thus be advantageously made of PTFE or another plastic material having equivalent properties, suitable for preventing, or anyway reducing, the friction with the dough I during the processing, thereby promoting the radial expansion thereof to form a pizza base.

The film 55 is fixed to the underside of the crown 500 of the plate 50 according to a profile that is flat at the centre and slightly raised towards the outer edge of the crown 500, along a circular band 55a: this solution allows making pizza bases with or without a swollen edge (the so-called "cornicione") in a simple and effective manner, as can be inferred from the following description of the operation of the above-described machine.

As can be easily understood, from a general operating viewpoint the process is started by laying a dose of dough I to be worked, in the usual loaf or bubble form, indicated by a dashed line in the drawings, onto the diaphragm 45 in a position aligned with the vertical revolution axis Y.

The quantity of dough I may be the one normally used for making pizza bases according to the typical commercial formats (28, 35 and 44 cm), or a different (greater or smaller) quantity.

In this regard, it is worth remarking that the dimensions of the diaphragm 45 and plate 50 of the machine 1 may differ depending on the machine model: in fact, as previously mentioned, the latter may be intended for pizza bases or other products of variable dimensions, and therefore also the plate and the diaphragm will have compatible dimensions.

In this condition, the plate 50 is lowered by a user via the control rod 54, which causes the articulated arm 3 to rotate until the plate 50 reaches the bottom dead centre, where it compresses the dough I; in this condition, the bottom face 55 of the plate 50 lies at a distance of approximately 15 mm from the diaphragm 45.

At the end of the downward stroke, the plate 50 is held in the lowered position by the force applied manually to the rod 54, which is sufficient to overcome the resistance of the dough being rolled out.

Note that, by means of the fine adjustment of the plate 50 effected through the threads 502 and 505, it is possible to cause it to remain still in the lowered condition due to the locking action exerted by the linkage 60 within the arm 3, as described above.

At this point, the electric motor 35 can be activated in order to rotate the assembly including the tapered rollers 21, 22 and the centre plate 25 about the vertical revolution axis Y.

For this purpose, different implementation solutions are possible, depending on whether the machine 1 is of the manual or automatic/semi-automatic type.

In the former case, an operator starts the motor 35 by pressing a button (not shown in the drawings) when the plate 50 is down at the dead bottom centre, whereas in the latter case the motor 35 will start automatically when the plate 50 is down in the same position. It is just worth adding that, in this latter case, the machine 1 is equipped with sensors and switches allowing for automatic operation.

In this operating condition, the dough I is squeezed between the diaphragm 45 of the worktable and the plate 50: therefore, it will tend to expand radially on the diaphragm 45, by exploiting the non-stick properties of its extrados 45b and of the bottom face 55 of the plate 50.

In this respect, it must be pointed out that the use of a material like PTFE (polytetrafluoroethylene or Teflon®) for the extrados 45b of the diaphragm 45 and for the film 55 results in a double advantageous effect.

The first one is that the surface facing the dough has very good non-stick properties and is perfectly self-lubricating, without requiring the addition of other lubricating or non-stick substances (grease, oil or the like), which might alter the organoleptic characteristics or even the taste of the dough.

The Applicant has also experimentally observed that the PTFE coating of the work surfaces ensures a high level of hygiene because the porosity of the Teflon-coated surfaces has proved suitable for not encapsulating and/or absorbing any residues of flour and/or remaining particles of dough.

A second advantageous effect verified by the Applicant is that, during the processing, the extrados 45b of the diaphragm 45 and the face 55 of the plate 50 become electrically polarized.

This phenomenon is generated by the friction between the dough and these surfaces and by the rotation of the tapered rollers 21, 22 on the intrados 45a of the diaphragm 45, which produces the effect of attracting a microlayer of flour that may have been previously spread by a user prior to working a dose of dough.

This microlayer further promotes the rolling and spreading of the dough, thus contributing to obtaining pizza bases of higher quality.

During the operation of the forming machine 1, through the effect of the friction against the silicone intrados 45a of the diaphragm 45, the tapered rollers 21, 22, roll on the latter and create, in the contact zone, an undulation extending diametrically relative to the circular base of the pizza to be obtained, which moves periodically at a frequency equal to the frequency of revolution about the vertical axis Y.

It follows that the mass of dough I will be cyclically stressed from below by the periodic undulation of the diaphragm 45, generated by the rotation and revolution of the underlying tapered rollers 21, 22.

The combined effect of the periodic undulation of the diaphragm from below and of the pressure exerted by the plate 50 from above allows thinning the dough and causing it to expand radially in a uniform manner, so as to obtain a pizza base having the predefined thickness and diameter.

In this frame, the cyclic reversal of the direction of revolution of the tapered rollers 21, 22 about their vertical axis Y turns out to be very advantageous, in that it allows obtaining an action equal and opposite to that of the previous cycle, so as to ensure uniformity in the rolling out of the dough and hence in the final product.

In other words, it can be stated that the system with the tapered rollers 21, 22 transmits to the dough, through the elastic diaphragm 45, a forming action in the form of a series of waves circularly moving in a radial direction on the diaphragm.

The elasticity of the silicone-based diaphragm 45 and the tension thus achieved allow the dough I to fill the areas not occupied by the tapered rollers 21, 22 during the compression phase exerted by the plate 50, thereby forming waves that press against the dough and turn it, thus working it evenly in a radial direction.

The characteristic impression of the cones 21, 22 through the diaphragm 45 simulates and optimizes the action of the palms of the hands of a skilled operator, typically a pizza maker, exerted while working the dough disk or base manually.

Through the diaphragm 45, the profile of the cones 21, 22 cyclically creates a bigger impression, and hence a greater rolling effect, on a portion of dough being worked; the intensity of such action is proportionally higher along the radius of that dough portion which is sequentially hit by the diaphragm-deforming wave generated by the tapered rollers.

This results in higher and progressively growing rolling power of the forming machine 1, which increases with the distance from the revolution axis Y.

This feature avoids the dough accumulation and stressing effect, which is normally generated in rolling machines with cylindrical rollers, which tend to remove the leavening gases from the dough, thus compressing the internal structure of the latter.

A contribution to this result is given by the bevelling of the cones 21, 22 in the proximity of their bases (more clearly visible in FIGS. 6 and 10), which provides a reduction in the forming action, resulting in accumulation of dough from the active zones closer to the centre, i.e. to the revolution axis.

The profile of the bottom face 55 of the plate 50 also contributes to this result, with the peripheral band or portion 55a receding relative to the central portion.

This makes it possible to make the swollen edge ("cornicione") of the pizza base in a simple, immediate and continuous manner, i.e. without interrupting the dough working process.

Likewise, if one wants to form a disk of dough without a swollen edge generated through accumulation of rolled dough along the perimeter, it will suffice to leave out the corresponding bevelling at the base of the cones 21, 22 in order to fully exploit the cones' rolling action in the straight part of their generatrix of contact with the diaphragm 45.

In other words, this means stopping the rolling action before the diameter of the disk of rolled dough reaches the edge of the cones 21, 22.

To this end, one may use a smaller dose of dough, so as to obtain a final disk of shorter diameter, or may use a machine having sufficiently large dimensions (diameters of plate 50, diaphragm 45 and cones 21, 22) to keep the rolled disk within the planarity limits of the cones and of the plate.

In other words, the forming method and machine according to the invention are operationally flexible, in that they allow the achievement of results tailored in accordance with the user's requirements.

In fact, by selecting a predefined quantity of dough and by forming it under a given pressure of the plate 50 as long as necessary, it is possible to obtain a pizza base having the desired thickness and diameter.

In this regard, it must be pointed out that, depending on the quantity of dough being worked, the pizza base that will be obtained may have a diameter smaller or greater than the diaphragm 45; the same also applies to the pressure exerted on the dough by the plate 50.

It should be noted that such pressure depends on the user and the force that he/she applies onto the rod or handle 54; this force may vary over time, i.e. it must not necessarily be equal throughout the forming process, since it may be greater at the beginning, when the dose D of loaf-shaped or bubble-shaped dough is compressed, and smaller towards the end of the process, when the pizza base layer has been substantially formed.

These features make the process of the invention not only particularly effective, but also operationally flexible, in that it can be adapted to different production requirements.

In this respect, it must also be observed that the forming machine 1 can be used to make pizza bases all having the same thickness, as well as pizza bases with a peripheral edge (the so-called "cornicione") bigger than the central layer.

This result is made possible by the fact that the extrados 45b of the diaphragm 45 advantageously protrudes relative to the worktable 40 of the base of the machine 1 by a difference in level S of a few millimetres (2-12 mm).

In order to form an edge bigger than the central layer of the pizza base, it is sufficient to cause the diameter of the formed dough to be greater than that of the diaphragm 45; in this way, the peripheral edge of the dough that will be formed externally to the diaphragm 45 will be bigger than the rest of the base, the thickness of which is S, to an extent substantially equal to the difference in level between the extrados 45b and the worktable 40.

As can be understood, the method of forming dough according to the invention, and the apparatus 1 for implementing it, allow solving the basic technical problem previously defined in this specification.

In fact, from an operational viewpoint the method of the invention allows forming a pizza base as if it were worked by hand, but without the aforementioned contraindications that this would imply.

It must be pointed out that the forming method can be executed mechanically by means of the machine 1 without any moving mechanical member coming in contact with the dough during the process.

It must be highlighted that the dough is supported throughout the working process on the diaphragm 45, which, in addition to serving as a support and manipulation surface for the dough, also acts as a separator screen between the dough and the moving mechanical members of the machine, namely the tapered rollers 21, 22.

This solution, i.e. compressing the dough from above by means of the plate 50 and massaging it from below through a cyclical local deformation of the diaphragm 45 caused by the tapered rollers 21, 22, makes it possible to substantially reproduce the effect of a pizza maker's hands stretching a pizza dough.

This is achieved without any moving mechanical members in contact with the dough being rolled out, which could damage the dough because of their speed: the tapered rollers 21, 22 are separated from the dough by the diaphragm 45, thus not being in contact with the dough and eliminating any risk of generating tension in the mass of dough.

The forming method according to the invention can be implemented in an automatic or semi-automatic manner through a machine like the one described herein and shown in the drawings, so that uniform and reliable results can be attained, independently of the human factor (i.e. the pizza maker).

Unlike the above-mentioned known Japanese machines, the machine 1 requires no sophisticated control systems, also because there is no contact between moving mechanical members and the dough, and therefore there is no need for any speed and/or torque limiting systems.

As previously explained, the machine 1 allows producing pizza bases in a short time of approximately 5-20 seconds, with predefined and even shape and organoleptic characteristics, like those made by hand by pizza makers.

Of course, the invention described so far may be subject to many variations, one of which is shown in FIGS. 13 and 14, wherein the same reference numerals designate parts in common with the previously described example.

As can be seen, in this case the machine 1 differs in that it is semi-automatic, since the articulated arm 3 is driven by a pneumatic or hydraulic actuator 154 that controls its rotation from the raised position of the plate 50 at the top dead centre to the lowered position at the bottom dead centre, where it presses against the dough to be worked.

This solution makes it superfluous to employ the above-mentioned handling rod 54 for manual control of the articulated arm 3, thus resulting in a new, fully automated version of the machine 1.

In this context, it is possible to implement to advantage the automatic start of the electric motor 35 that controls the revolution of the tapered rollers 21, 22 when the plate 50 is closed or lowered.

These and other similar variants of the machine of the invention will still fall within the scope of the following claims.

The invention claimed is:

1. A machine for forming food doughs for making bases for pizza and the like, comprising:
   a dough supporting diaphragm, which is at least partially deformable;
   a cover or plate adapted to be moved between an idle position, in which it is raised above the diaphragm, and an operating position, in which it is set against the diaphragm, so as to compress a mass of dough laid thereon, and vice versa;
   means for deforming the diaphragm, operating on that side of the latter which is opposite to the side whereon the dough has been laid,
   wherein the plate is supported by an articulated arm, which can be actuated manually and/or automatically in order to move the plate into said operating and idle positions,
   wherein the articulated arm comprises an articulated quadrilateral structure adapted to hold the plate in a condition substantially parallel to the diaphragm during the translations between said operating and idle positions, and vice versa.

2. A method of forming food doughs for making bases for pizza and the like using the machine of claim 1, comprising the operational steps of:
   (a) compressing a predefined mass of dough between two surfaces;
   (b) rolling the compressed dough through at least one of said surfaces to generate periodic pressure waves within its mass.

3. The method of rolling according to claim 2, wherein the pressure waves extend radially relative to the shape of the base to be made.

4. The method according to claim 2, wherein the pressure waves rotate relative to the mass of dough.

5. The method according to claim 4, wherein the pressure waves rotate in alternate cycles.

6. The method according to claim 2, wherein the pressure waves are generated from below, through the bottom surface whereon the mass of dough has been laid.

7. The method according to claim 2, comprising the step of forming a swollen peripheral edge of the pizza base by expanding the dough radially beyond a predefined limit.

8. A machine for forming food doughs for making bases for pizza and the like, comprising:
   a dough supporting diaphragm, which is at least partially deformable;
   a cover or plate adapted to be moved between an idle position, in which it is raised above the diaphragm, and an operating position, in which it is set against the diaphragm, so as to compress a mass of dough laid thereon, and vice versa;
   means for deforming the diaphragm, operating on that side of the latter which is opposite to the side whereon the dough has been laid,
   wherein the plate is supported by an articulated arm, which can be actuated manually and/or automatically in order to move the plate into said operating and idle positions,
   wherein the plate comprises a fitting for connecting to the arm, and a crown adjustably associated with the fitting,
   wherein the crown is associated with the fitting by means of a threaded connection, which allows for fine adjustment of the distance between the bottom face of the plate and the diaphragm when the plate is in the lowered operating condition.

9. A method of forming food doughs for making bases for pizza and the like using the machine of claim 8, comprising the operational steps of:
   (a) compressing a predefined mass of dough between two surfaces;
   (b) rolling the compressed dough through at least one of said surfaces to generate periodic pressure waves within its mass.

10. The method of rolling according to claim 9, wherein the pressure waves extend radially relative to the shape of the base to be made.

11. The method according to claim 9, wherein the pressure waves rotate relative to the mass of dough.

12. The method according to claim 11, wherein the pressure waves rotate in alternate cycles.

13. The method according to claim 9, wherein the pressure waves are generated from below, through the bottom surface whereon the mass of dough has been laid.

14. The method according to claim 9, comprising the step of forming a swollen peripheral edge of the pizza base by expanding the dough radially beyond a predefined limit.

* * * * *

UNITED STATES PATENT AND TRADEMARK OFFICE
CERTIFICATE OF CORRECTION

PATENT NO. : 11,896,014 B2
APPLICATION NO. : 16/652864
DATED : February 13, 2024
INVENTOR(S) : Morello It is certified that error appears in the above-identified patent and that said Letters Patent is hereby corrected as shown below:

On the Title Page

Column 2 Line 3 Under Item (56) References Cited, U.S. Patent Documents: 5,204,125 A 4/1993 "Arsen" should be "Larsen"

Signed and Sealed this
Twenty-fifth Day of June, 2024

Katherine Kelly Vidal
*Director of the United States Patent and Trademark Office*